United States Patent [19]
Barton et al.

[11] Patent Number: 5,828,733
[45] Date of Patent: Oct. 27, 1998

[54] METHOD AND ARRANGEMENT FOR INCREASING DATA TRANSMISSSION RATE OVER TELEPHONE CABLE

[75] Inventors: David M. Barton; Eugen Gershon; Muoi Huynh, all of San Jose, Calif.

[73] Assignee: Advanced Micro Devices, Inc., Sunnyvale, Calif.

[21] Appl. No.: 416,129

[22] Filed: Apr. 3, 1995

[51] Int. Cl.⁶ ............................. H04M 11/00; H04B 1/38
[52] U.S. Cl. .................................. 379/93.01; 379/93.05; 379/93.06; 375/219
[58] Field of Search ................................. 579/90, 93, 96, 579/97, 98, 110, 387, 399, 412, 416, 442; 375/257, 260, 286, 288, 290, 296, 346, 219–222; 395/306, 307

[56] References Cited

U.S. PATENT DOCUMENTS

| | | | |
|---|---|---|---|
| 4,901,342 | 2/1990 | Jones | 379/93 |
| 5,119,402 | 6/1992 | Ginzburg et al. | 375/260 |
| 5,384,769 | 1/1995 | Oprescu et al. | 375/286 |
| 5,424,657 | 6/1995 | Van Brunt et al. | 326/63 |
| 5,467,061 | 11/1995 | Aden et al. | 375/257 |
| 5,485,488 | 1/1996 | Van Brunt et al. | 375/257 |
| 5,509,126 | 4/1996 | Oprescu et al. | 395/307 |
| 5,544,323 | 8/1996 | Heaton et al. | 395/200.14 |
| 5,559,967 | 9/1996 | Oprescu et al. | 395/306 |
| 5,592,510 | 1/1997 | Van Brunt et al. | 375/257 |

FOREIGN PATENT DOCUMENTS

| | | |
|---|---|---|
| 0 404 994 | 1/1991 | European Pat. Off. . |
| 2 060 317 | 4/1981 | United Kingdom . |
| WO 95/2735 | 10/1995 | WIPO . |

OTHER PUBLICATIONS

Proceedings of the Institution of Electrical Engineers, vol. 126, No. 9, Sep. 1979, pp. 893–900, Tucker: "A technical history of phantom circuits".

*Primary Examiner*—Wing F. Chan
*Assistant Examiner*—George Eng

[57] ABSTRACT

A method and arrangement for transferring data between nodes over a telephone cable that couples the nodes provides a dual configuration node transmitter, and a dual configuration node receiver. The dual configuration transmitter has a first transmitter circuit that transmits data over a first configuration of the telephone cable and a second transmitter that simultaneously transmits other data over a second configuration of the telephone cable. The dual configuration receiver is coupled to the telephone cable and has a first receiver circuit that selects the data transmitted by the first transmitter circuit and rejects the data transmitted by the second transmitter circuit, and a second receiver circuit that selects the data transmitted by the second transmitter circuit and rejects the data transmitted by the first transmitter circuit. The transmitting of data over two configurations of the same cable allows data to be transmitted twice as fast as over the same cable set up for transmission in a single configuration. Alternatively, in an Ethernet application, one configuration may carry the data while the other configuration simultaneously carries activity information.

22 Claims, 4 Drawing Sheets

METHOD AND ARRANGEMENT FOR INCREASING DATA TRANSMISSSION RATE OVER TELEPHONE CABLE

BACKGROUND OF THE INVENTION

1. Technical Field of the Invention

The present invention relates to the field of data communication, and more particularly, to the transmission of data over telephone cable.

2. Description of Related Art

The use of standard telephone wire to carry data between systems is well-known. The data may be 10-base-T (Ethernet) data or 10-base-2 data, for example. The standard telephone wire that carries the data may be flat, four-conductor telephone wire.

There are numerous ways by which the data may propagate over the telephone wire. When used to carry telephone signals, for instance, one of the pairs of wires carries one telephone line while the adjacent pair of wires carries another telephone line, to create a two-line phone. According to the standard color coding of the wires, (black, red, green, yellow, in that order), the black and red pair carries one telephone line and the green and yellow pair carries the other telephone line.

Although this standard telephone wire pairing scheme is satisfactory for carrying two telephone conversations, using it to carry high-frequency data has some attendant problems. When a telephone cable is used to carry high-frequency data there can be excessive crosstalk, radio emissions, and sensitivity to radio broadcasting due to the inherent unbalance in the telephone wire pairing scheme. Telephone cable is therefore considered a low performance transmission medium for digital data with severely limited bandwidth and therefore a limited data transmission rate.

Telephone cable has been used, however, to transfer data at Ethernet rates over relatively short distances. To overcome some of the problems of carrying high-frequency data over telephone wires, a common data network scheme connects the two inside wires of standard telephone cable in parallel and drives them against the two outside wires. FIG. 2 depicts a network node that uses this wiring scheme, shown here as the "RG-BY configuration". Both ends of the network cable are terminated with resistors that equal the characteristic impedance of the cable. In the RG-BY configuration, the resistors need to provide a resistance of approximately 50 ohms.

In another possible wiring configuration of telephone cable for carrying high-frequency data, the two inner wires are driven differentially, and the outer pair is paralleled and grounded at each network node. The outer pair of wires reduces the characteristic impedance and provides shielding of the transmission. This is hereafter referred to as the "R-G" configuration and is depicted in FIG. 3. The R-G configuration has a characteristic impedance of approximately 100 ohms, and its balance to surroundings and self-shielding make it superior to the RG-BY configuration in radio emission and susceptibility. Data signal attenuation in the R-G configuration is the same, for a given cable length, as in the RG-BY configuration.

The use of standard telephone cable in one of the known configurations at the standard Ethernet rate of 10 Mbit/sec limits the data transmission distance to approximately 100 to 200 meters. This limited data transmission distance, however, diminishes the attractiveness of using standard telephone cable as a data transmission medium in networks.

Also, other information, such as collision information that normally accompanies data in Ethernet applications, cannot be sent simultaneously with the data over the telephone cable while achieving the data transfer rate required for Ethernet compatibility.

SUMMARY OF THE INVENTION

There is a need for a method and arrangement for using standard telephone cable as a data transmission medium in networks, but with increased data transmission rates and the ability to transmit and receive collision information in addition to data transferred at high speeds.

This and other needs are met by the present invention which provides an arrangement for transferring data between nodes over a telephone cable that couples the nodes, comprising a dual configuration transmitter at one of the nodes, and a dual configuration receiver at another one of the nodes. The dual configuration transmitter has a first transmitter circuit that transmits data over a first configuration of the telephone cable and a second transmitter that simultaneously transmits other data over a second configuration of the telephone cable. The dual configuration receiver is coupled to the telephone cable and has a first receiver circuit that separates the data transmitted by the first transmitter circuit from the data transmitted by the second transmitter circuit, and a second receiver circuit that separates the data transmitted by the second transmitter circuit from the data transmitted by the first transmitter circuit.

The simultaneous transmitting of data over two configurations of the same cable allows data to be transmitted twice as fast over the same cable set up for transmission in a single configuration. Alternatively, in an Ethernet application in which the data transfer rate is 10 Mbit/sec, one configuration may carry the data while the other configuration is used to carry collision information.

In certain preferred embodiments of the present invention, the telephone cable is a four-wire cable having two inner wires and two outer wires, where the first transmitter circuit transmits data by driving the two inner wires differentially in the first configuration of the telephone cable, and the second transmitter circuit transmits data by driving the pair of two inner wires differentially with respect to the pair of two outer wires. This arrangement has the advantage of using standard telephone cable to provide two different configurations that independently carry data.

The earlier stated needs are also met by another aspect of the invention which provides a data transfer network comprising a cable that is multiply configurable and nodes that transfer data over the network via the cable. At least one of the nodes has transmitter means for transmitting first data over the cable in a first configuration of the cable and for simultaneously transmitting second data over the cable in a second configuration of the cable. At least one other node has receiver means for receiving and separating the first and second data from each other.

The above stated needs are met by a further aspect of the invention which provides a method of transferring data over a cable connecting nodes of a network, comprising the steps of transmitting first data from a first node over a first configuration of the cable and simultaneously transmitting second data from the first node over a second configuration of the cable, and separating the first data from the second data at a receiver at the second node.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
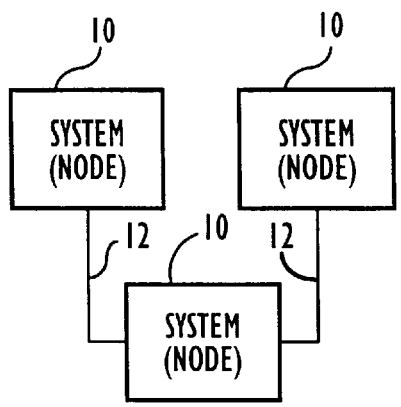
FIG. 1 is a block diagram of a network.

A simple network is depicted in block diagram form in FIG. 1 and comprises a plurality of systems 10 that transmit and/or receive digital data over standard four-wire telephone cable 12 that connects the systems together. Each system 10 can be, for example, a processor or other digital data device such as a printer. Although a simple network is depicted in FIG. 1 for ease of explanation, the present invention is not limited to such simple networks and finds utility in more complicated arrangements.

Figure 2:
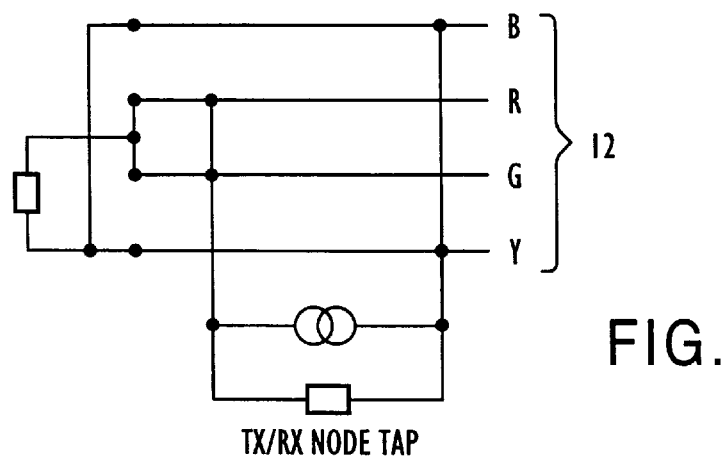
FIG. 2 is a schematic diagram of a network node that is wired in an RG-BY configuration.
Figure 3:
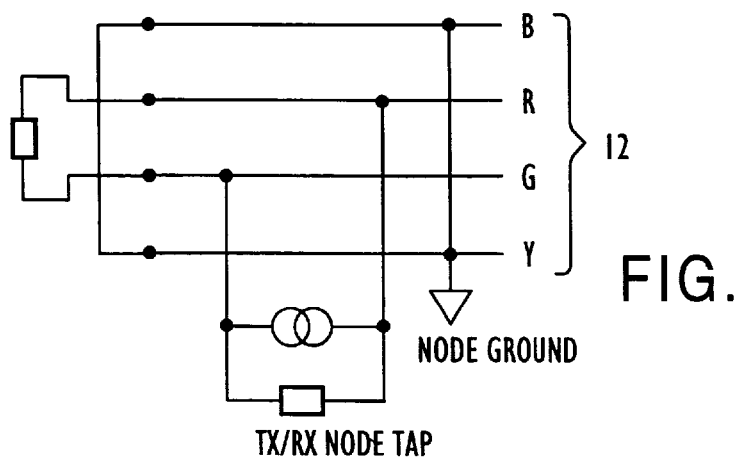
FIG. 3 is a schematic diagram of a network node that is wired in an R-G configuration.

The wiring configurations for the conventional RG-BY configuration and the R-G configuration have already been described with respect to FIGS. 2 and 3. The present invention takes advantage of the fact that in a perfectly constructed cable using an arrangement in which both configurations are present, the electric-field and magnetic-field coupling between the RG-BY configuration and the R-G configuration both null out. This means that ideally, a signal propagating in either of these configurations has no effect on, and is not affected by, a signal propagating in the other configuration. However, interconfiguration coupling for actual telephone cable is not zero.

There are two types of inter-configuration crosstalk that are of concern in such an arrangement. "Forward crosstalk" is defined as the coupling between a signal entering one end of a cable in one configuration and exiting the other end in the other configuration. The amplitude of the desired-configuration signal arriving at the distal end of a cable relative to that of the undesired signal provides a type of signal-to-noise ratio. In measurements over the frequency range of 0.83 MHz (the lowest frequency used by 10-base-T network systems) to 10 MHz, the ratio was 22 dB. This ratio is sufficient for data signaling with a reasonable bit-error rate.

Another type of crosstalk is "reverse crosstalk", defined in this context as the coupling between a signal transmitted at one end of a cable in one configuration and the other configuration at the same end. A favorable reverse crosstalk figure is desirable as it would allow full duplex operation in which data flows simultaneously in both directions on the cable.

The reverse crosstalk signals have been measured between −32 dB and −24 dB relative to the transmitter signal. The normal signal attenuation of 600 feet of cable in either configuration at 10 MHz may be as high as 18.5 dB, leaving a signal-to-noise ratio of less than 6 dB in certain cables. This makes full-duplex operation with standard telephone cable problematical, although it may be practical with carefully made four-wire flat cable or with shielded twisted pair cable.

The present invention takes advantage of the forward crosstalk results to provide half-duplex operation in both configurations simultaneously on a standard telephone cable. The simultaneous use of two configurations to transfer data allows the data transfer rate to be twice as fast, or activity information to be simultaneously transmitted with data. "Activity information" is information on data signals transmitted over the other configuration.

The present invention uses two transmitters, in a node located anywhere along a network cable, such as a 600 foot network cable for example, to send different data packets in each of the two configurations. Two receivers in another node, located anywhere else along the cable, are able to receive both signals. By equally apportioning a data file among the packets sent in the two configurations, the overall data transfer rate will be twice that of a conventional 10-base-T system operating at the same clock speed.

Figure 4:
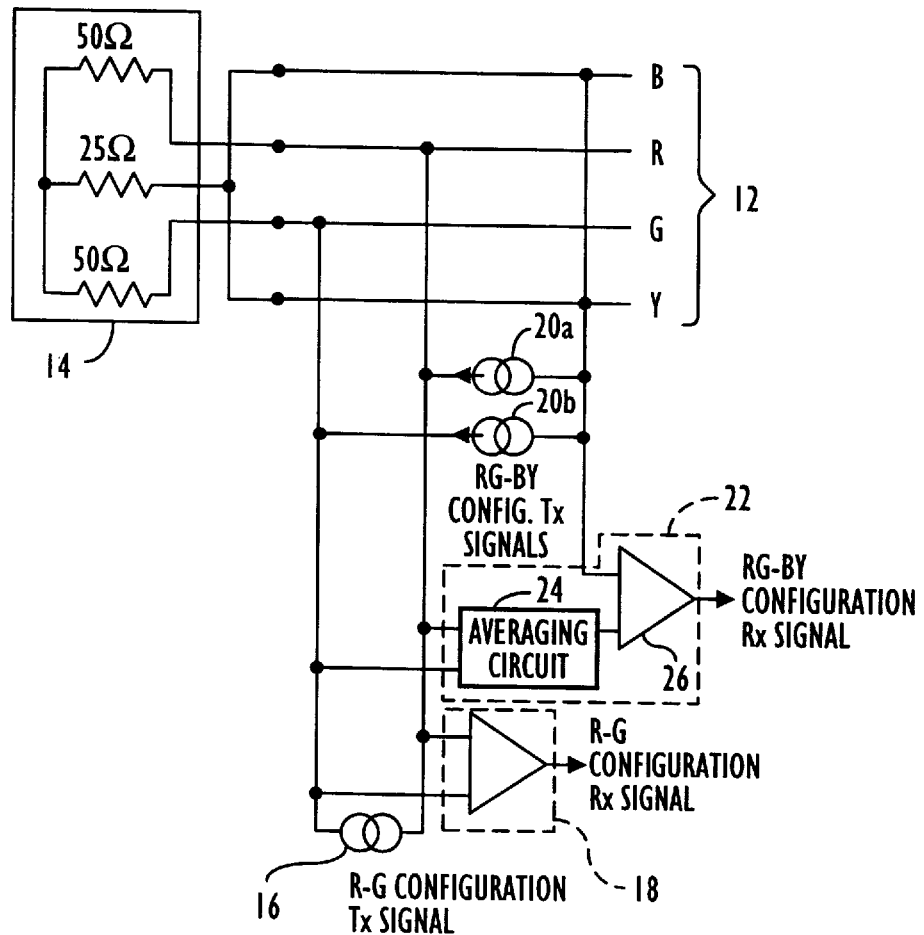
FIG. 4 is a schematic diagram of a network node that is wired according to the present invention in a dual configuration.

An embodiment of the present invention in which both the RG-BY and R-G configurations are accessed simultaneously is depicted in FIG. 4 in a basic representation for explanatory purposes of the connection to the telephone cable. More detailed diagrams of the components of the transmitters and receivers are provided in FIGS. 5, 5a and 6. The standard telephone cable 12 is used in this embodiment, with a black wire B, a red wire R, a green wire G and a yellow wire Y. Cable terminations are used at both ends of the network only. The termination 14 terminates both of the RG-BY and R-G configurations, each with its own characteristic impedance. The termination 14 comprises two 50 ohm resistors and a 25 ohm resistor. The depicted exemplary arrangement of the resistors in the termination 14 provides the R-G configuration impedance of 100 ohms as well as the RG-BY configuration impedance of 50 ohms. The same termination 14, with different resistances, may be used to terminate any two impedances. A triangular "delta" arrangement of three resistors may be used for the termination instead of the "Y" termination shown.

In the arrangement of FIG. 4, an R-G configuration transmitter 16 and an R-G configuration receiver 18 are provided and operate as if the RG-BY configuration did not exist. The R-G transmitter 16, coupled between the red R and green G wires, excites the red-green wire pair (R,G) differentially. The R-G receiver 18, comprising a differential amplifier, has its two inputs respectively coupled to the red R and green G wires. Hence, the R-G receiver 18 will respond only to the difference in voltage between the red R and green G wires, ignoring any common-mode voltages on the red R and green G wires.

The arrangement of FIG. 4 also includes an RG-BY transmitter 20 and an RG-BY receiver 22. The RG-BY transmitter 20 has a first current source 20a that drives current from the parallel connected black B and yellow Y wires to the red R wire. The second current source 20b produces an identical, in-phase current from the black B and yellow Y wires to the green G wire. If the telephone cable 12 is symmetrical, these identical currents produce identical, in-phase voltages on the red and green wires, as measured from the black B or yellow Y wires. To the R-G configuration receiver 18, these voltages are common-mode signals and are therefore ignored.

The RG-BY receiver 22 comprises an averaging circuit 24 and a differential amplifier 26. The averaging circuit 24 tracks the average of the voltage on the red R and green G wires. Hence, the averaging circuit 24 only sees the common-mode signals on these wires and ignores the differential R-G signals. The differential amplifier 26 responds to the difference between the average voltage of the red R and green G wires and the voltage on the black B or yellow Y wires. This is the same voltage that the RG-BY transmitters 20a, 20b produce.

With the arrangement of the invention as depicted in FIG. 4, each transmitter (R-G transmitter 16 and RG-BY transmitter 20) excites a configuration that its own type of receiver can separate, but which is "invisible" to the other type of receiver.

Figure 5:
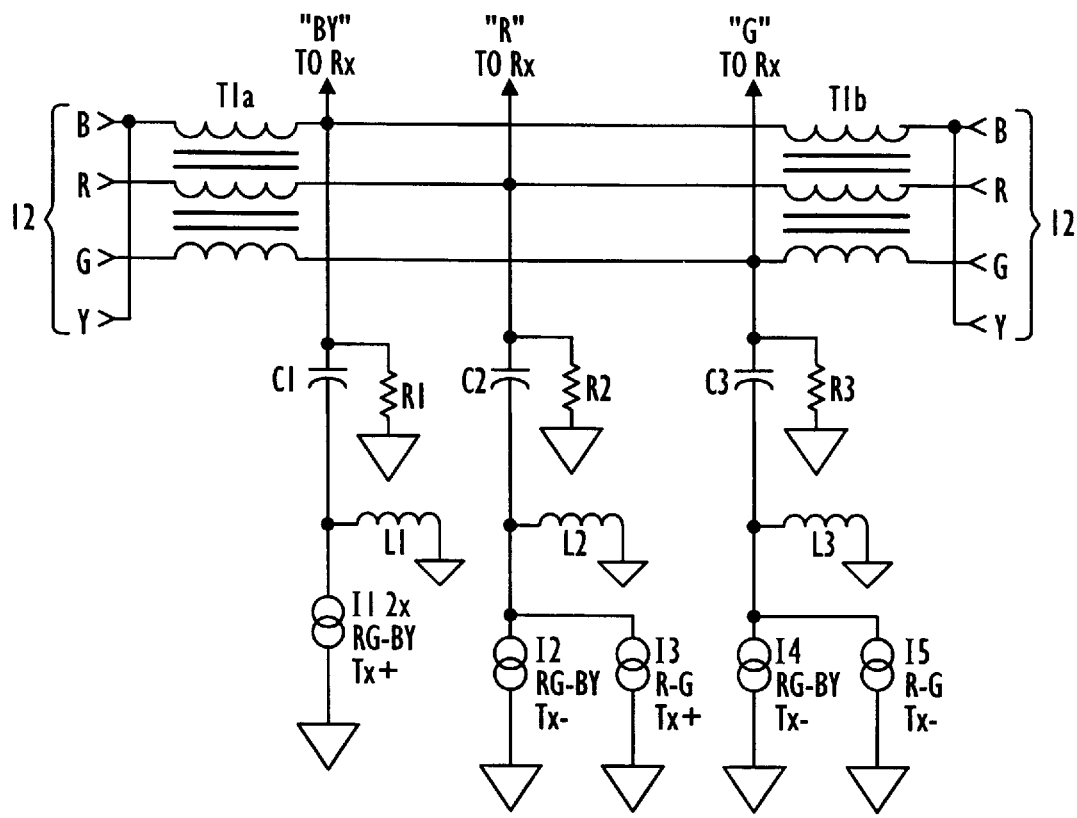
FIG. 5 is a diagram of dual configuration transmitter circuitry constructed in accordance with an embodiment of the present invention.

FIG. 5 is a schematic diagram of an embodiment of dual-configuration transmitter circuitry constructed in accordance with the present invention. The transmitter circuitry of FIG. 5 is the same as that represented in FIG. 4, but in a more detailed representation.

The transmitter circuitry uses two trifilar baluns T1a, T1b to accommodate the three network cable paths through each node. The baluns T1a, T1b are conventional passive devices, and allow a network that is wired for the RG-BY configuration, which is roughly balanced, to interface with coaxial Ethernet cable, which is unbalanced. The baluns T1a and T1b reject radio signals, and their leakage inductance compensates for the capacitive loading of the circuitry.

In the embodiment of FIG. 5, resistors R1, R2, and R3 provide a DC path to ground for the telephone wires B, R, G, and Y. The R-G transmitter 16, comprises capacitor C2 coupled to the red wire R, inductor L2 and current source I3 that produces a current on the red wire R. The R-G transmitter 16 also comprises capacitor C3 coupled to the green wire G, inductor L3 and current source I5 that produces current on the green wire G. The current sources I3 and I5 are driven 180 degrees out of phase with each other and are formed, in preferred embodiments, by the drains of a differential MOSFET pair, with a DC constant-current circuit connected to their sources.

Signals are transmitted in the R-G configuration by the differential driving of signals on the R-G pair of wires. The differential signals transmitted over the R-G pair of wires by the current sources I3 and I5 do not affect, and are not affected by, the differential signals transmitted over the RG and BY pairs of wires by the current sources I1, I2, and I4. Thus, two different signals may be simultaneously transmitted over the telephone cable 12 by the transmitters 16 and 20.

The RG-BY transmitter 20 comprises capacitor C1, inductor L1 and current source I1. The capacitor C1 is coupled to the black B and yellow Y wires. The current source I1 produces the positive component of the differential current provided to the RG-BY wires, in particular, to the black B and yellow Y wires.

Figure 5A:
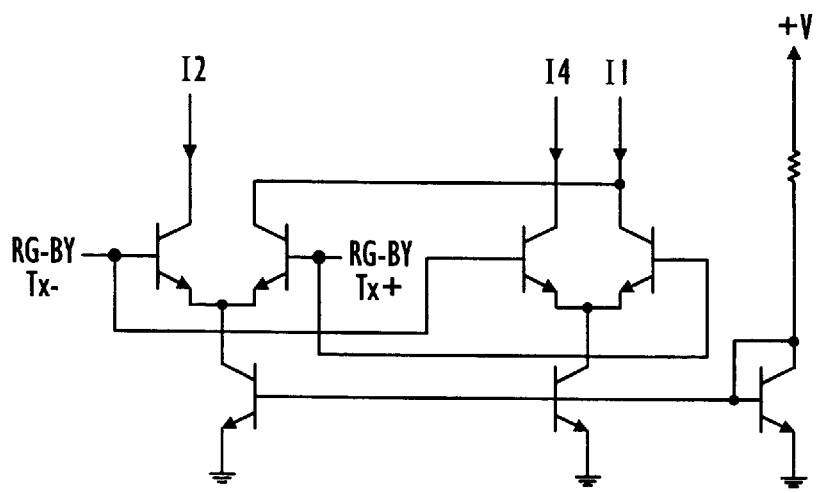
FIG. 5a is a schematic diagram of a current source.

The RG-BY transmitter 20 also comprises capacitor C2 coupled to the red R wire, an inductor L2, and a current source I2. The RG-BY transmitter 20 further comprises capacitor C3 coupled to the green G wire, an inductor L3, and a current source I4. The current sources I2 and I4 operate in phase with each other, but 180 degrees out of phase with current source I1. Each of the current sources I2 and I4 produces exactly one half of the current source's I1 amplitude. The three current sources I1, I2, I4 are equivalent to the in-phase pair of AC current sources 20a, 20b in FIG. 4. These current sources are implemented in preferred embodiments (as seen in FIG. 5a) as two balanced, differential pairs that are driven in parallel by a DC constant-current source connected to their sources. The current source I1 would then be formed by the paralleled collectors/drains of both of the transistors of one phase. The current sources I2 and I4 are each then formed by the collector/drain of one or the other of the two transistors of the opposite phase.

Signals are transmitted in the RG-BY configuration by the driving of the BY pair of wires by the current source I1, and the 180 degree out of phase driving of the RG pair of wires by the current sources I2 and I4. In this way, the BY pair of wires essentially acts as a single wire as does the RG pair of wires for differential driving of the two pairs of wires to transmit information in the RG-BY configuration.

Figure 6:
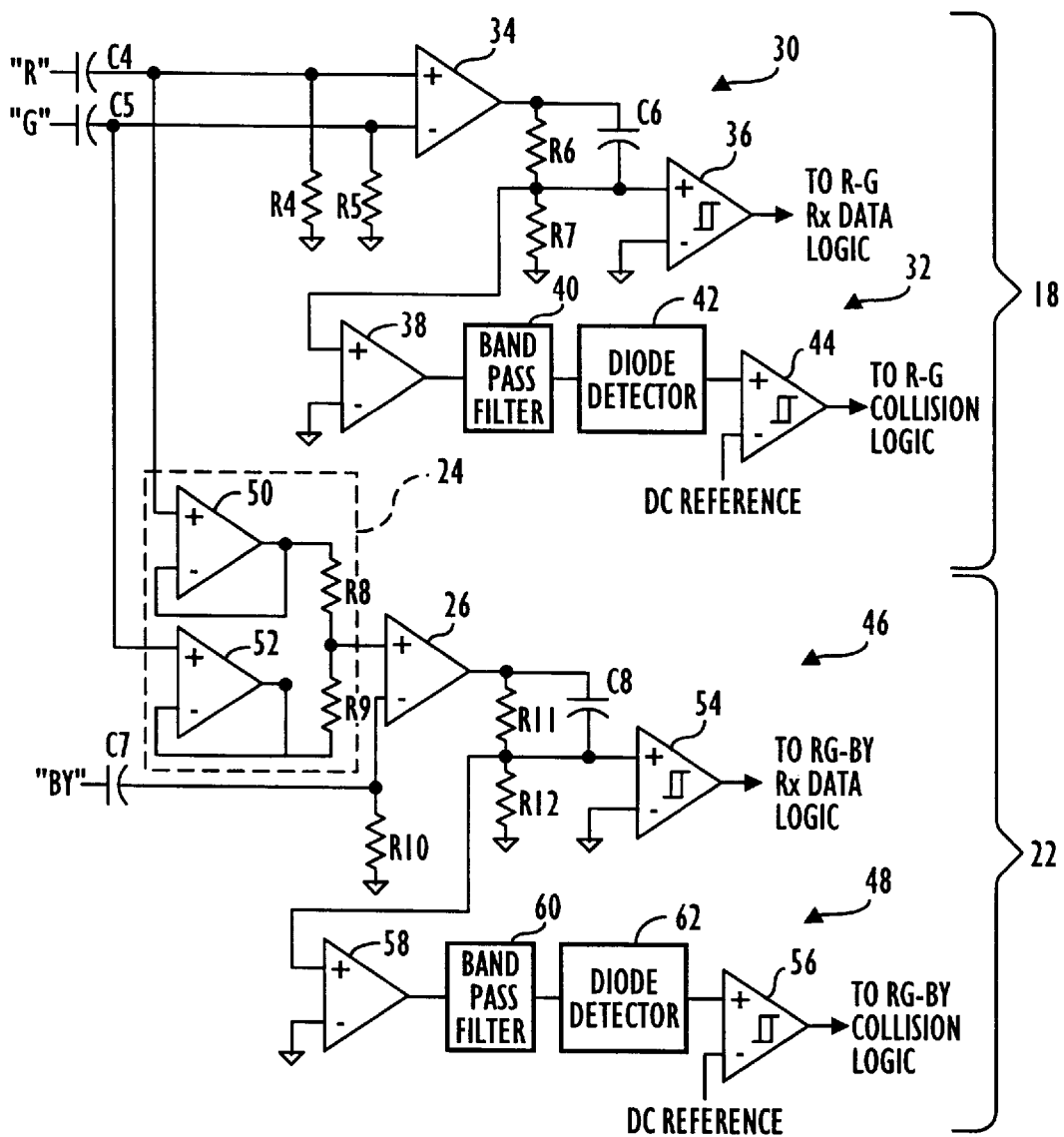
FIG. 6 is a diagram of dual configuration receiver circuitry constructed in accordance with an embodiment of the present invention.

FIG. 6 is a more detailed schematic diagram of the receiver circuitry 18 and 22 depicted in FIG. 4 for a node. This receiver circuitry enables the signals sent over the two configurations of the telephone cable 12 to be separated.

The R-G receiver 18, coupled only to the red R and green G wires of the telephone cable 12, has two sections 30, 32. The first section 30 is the R-G data section. This first section 30 has a differential amplifier 34 whose inputs are respectively coupled to the red R and green G wires via capacitors C4 and C5. Resistors R4 and R5 are also coupled to the capacitors C4 and C5. The output of the differential amplifier 34 is provided to a first input of a comparator 36 through resistor R6 and capacitor C6. A resistor R7 is coupled between the first input of the comparator 36 and ground. R6, C6 and R7 provide cable equalization.

The R-G data section 30 only responds to the differential signals on the red R and green G wires, and does not respond to the voltages on the black B and yellow Y wires. The comparator 36, whose second input is coupled to ground, converts the analog differential signals to a digital data signal that can be used by receiver data logic coupled to the output of the comparator 36.

The second section 32 of the R-G receiver 18 detects R-G activity. The R-G activity section 32 includes a differential amplifier 38 whose first input is coupled to the connection between R6, C6 and R7. Hence, this first input of differential amplifier 38 receives the same signal as the first input of the comparator 36 of the R-G data section 30. The second input of the differential amplifier 38 is coupled to ground.

The output of the differential amplifier 38 is filtered by a bandpass filter 40 to eliminate noise. The filter output is rectified by a diode detector 42. The output of the diode detector is coupled to a first input of a comparator 44, whose second input is coupled to a DC reference. The comparator 44 digitizes the R-G activity signals and provides the digitized signals to conventional activity logic.

The RG-BY receiver 22 is in most respects constructed the same as the R-G receiver 18, with an RG-BY data section 46 and an KG-BY activity section 48. However, the RG-BY receiver 22 also includes an averaging circuit 24 that is coupled to the red R and green G wires via the capacitors C4 and C5. The averaging circuit 24 includes a voltage follower formed by amplifiers 50, 52 and a voltage divider formed by resistors R8 and R9. The midpoint of the voltage divider is coupled to a first input of the differential amplifier 26 to provide this input with the average of the signals carried by the red R and green G wires. The second input of the differential amplifier 26 receives, via capacitor C7, the signal carried by the black B and yellow Y wires. The signals carried by the red R and the green G wires together form one side of a differential signal, while the signals carried by the black B and yellow Y wires form the other side of that differential signal.

The elements other than the averaging circuit 24 of the RG-BY receiver 22 perform the same functions as the corresponding elements of the R-G receiver 18. The other elements include the capacitor C8, the resistors R10, R11, R12, the comparators 54, 56, the amplifier 58, the bandpass filter 60 and the diode detector 62.

With the transmitters 16, 20 and the receivers 18, 22 of the present invention, data can be transferred over two different configurations of the telephone cable 12 simultaneously to achieve a data transfer rate twice that of either configuration alone. A known controller, such as the MACE am79C940, or the ILACC am79C900, or the PCnet ISAPLUS 70C961, all manufactured by Advanced Micro Devices of Sunnyvale, Calif., may be used to control the sending of data packets by the transmitters 16, 20.

As briefly explained earlier, instead of using the invention to carry data over both configurations simultaneously, the present invention can also be used to simultaneously send data over one of the configurations and activity information over the other one of the configurations. This method of use of the invention has particular utility with Ethernet applications, which currently have a data transfer rate of 10 Mbit/sec. This frees one of the configurations to carry Ethernet collision information, which was not carried in prior arrangements for transferring data over a telephone cable according to the Ethernet protocol.

Collision signals are defined for purposes of the present invention as signals carrying information on the data that is being sent over the other configuration, in this instance, the RG-BY configuration. Hence, when data is being sent over the RG-BY configuration, collision signals may be sent simultaneously over the R-G configuration. Alternatively, the data may be sent over the R-G configuration and the collision signals over the RG-BY configuration. Collision signals typically provide the information necessary for a receiver to determine if a collision of data has occurred, such as may happen when data from two different nodes appear simultaneously on the telephone cable 12.

Although the present invention has been described and illustrated in detail, it is clearly understood that the same is by way of illustration and example only and is not to be taken by way of limitation, the spirit and scope of the present being limited only by the terms of the appended claims.

We claim:

1. An arrangement for transferring data between nodes over a telephone cable that couples the nodes, the telephone cable comprising two inner wires and two outer wires, comprising:

a dual configuration transmitter at one of the nodes, the dual configuration transmitter having a first transmitter circuit that transmits data over a first configuration of the telephone cable and a second transmitter circuit that simultaneously transmits other data over a second configuration of the telephone cable, the first and second configurations being different from each other; and a dual configuration receiver at another one of the nodes and coupled to the telephone cable, the dual configuration receiver having a first receiver circuit that separates the data transmitted by the first transmitter circuit from the data transmitted by the second transmitter circuit, and a second receiver circuit that separates the data transmitted by the second transmitter circuit from the data transmitted by the first transmitter circuit, wherein the first transmitter circuit transmits data by driving the two inner wires differentially in the first configuration of the telephone cable, and the second transmitter circuit transmits data by driving the pair of two inner wires differentially with respect to the pair of two outer wires.

2. The arrangement of claim 1, wherein the four-wire cable is a standard cable with the two inner wires being a red wire and a green wire, and the two outer wires being a black wire and a yellow wire.

3. The arrangement of claim 1, wherein the first transmitter circuit includes matched differential current sources respectively coupled to the inner two wires.

4. The arrangement of claim 3, wherein the matched differential current sources comprise drains of a differential pair of transistors.

5. The arrangement of claim 4, wherein the second transmitter circuit includes a first current source that drives the pair of two outer wires with a first current, and a second current source that drives one of the inner two wires with a second current that is 180 degrees out of phase with the first current, and a third current source that drives the other of the inner two wires with a third current that is 180 degrees out of phase with each other.

6. The arrangement of claim 5, wherein the at least one of the first and second transmitter circuits include an equalization circuit.

7. The arrangement of claim 6, wherein the second and third currents each have an amplitude of one half of the current produced by the first current source.

8. The arrangement of claim 7, further comprising baluns that couple the first and second transmitter circuits to the four-wire cable.

9. The arrangement of claim 5, wherein the first receiver circuit includes a data section that receives the differential signals on the inner two wires and produces digital signals representative of the data transmitted by the first transmitter circuit.

10. The arrangement of claim 9, wherein at least one of the first and second receiver circuits include an equalization circuit.

11. The arrangement of claim 10, wherein the data section of the first receiver includes a first differential amplifier having a first input coupled to one of the inner two wires and a second input coupled to the other one of the inner two wires, and a first comparator coupled to the first differential amplifier and that produces the digital signals representative of the data transmitted by the first transmitter circuit.

12. The arrangement of claim 11, wherein the second receiver circuit includes a data section that receives the signals on the inner two wires, the signals on the outer two wires and produces digital signals representative of the data transmitted by the second transmitter circuit.

13. The arrangement of claim 12, wherein the second receiver circuit includes a data section that includes an averaging circuit that receives the signals on the inner two wires and produces an average signal, a second differential amplifier which has a first input that receives the average signal and a second input that receives the signals on the outer two wires, and a second comparator coupled to the second differential amplifier and which produces the digital signals representative of the data transmitted by the first transmitter circuit.

14. The arrangement of claim 13, wherein the first receiver circuit includes a first activity circuit and the second receiver circuit includes a second activity circuit, each of the first and second activity circuits respectively detecting activity information transmitted by one of the first and second transmitting circuits.

15. The arrangement of claim 14, wherein the data transmitted by the first transmitter circuit is collision information related to the other data transmitted by the second transmitter circuit.

16. The arrangement of claim 14, wherein the other data transmitted by the second transmitter circuit is collision information related to the data transmitted by the first transmitter circuit.

17. A data transfer network comprising:
a cable that is multiply configurable, the cable comprising two inner wires and two outer wires; and
nodes that transfer data over the network via the cable, with at least one node having transmitter means for transmitting first data over the cable in a first configuration of the cable and for simultaneously transmitting second data over the cable in a second configuration of the cable, the first and second configurations being different from each other, with at least one other node having receiver means for receiving and separating the first and second data from each other,
wherein the transmitter means includes first configuration transmission means for driving the two inner wires with a differential signal to thereby form the first configuration of the cable, and wherein the receiver means includes first configuration receiver means for responding only to the differential signal on the two inner wires.

18. The network of claim 17, wherein the transmitter means includes second configuration transmission means for driving the two inner wires with a differential signal relative to the two outer wires to thereby form the second configuration of the cable, and wherein the receiver means includes second configuration receiver means for responding only to the differential signal of the two inner wires relative to the two outer wires.

19. The network of claim 18, wherein the second configuration transmission means includes means for driving a first current from the outer wires to one of the inner wires and for driving a second current from the outer wires to the other one of the inner wires, the first and second currents being identical, in-phase currents.

20. The network of claim 19, wherein the second configuration receiver means includes averaging means for averaging the signals carried by the two inner wires to produce an average signal, and means for differentially amplifying the average signal with signals carried by the two outer wires.

21. A method of transferring data over a cable, the cable comprising two inner wires and two outer wires, connecting nodes of a network, comprising:
transmitting first data from a first node over a first configuration of the cable and simultaneously transmitting second data from the first node over a second configuration of the cable, the first and second configurations being different from each other; and
separating the first data from the second data at a receiver at the second node, wherein the step of transmitting includes transmitting the first data as a differential signal over the two inner wires and transmitting the second data as a differential signal formed by the average of the signals on the inner two wires and the signals on the outer two wires.

22. The method of claim 21, wherein the first data is activity information relating to the second data.

* * * * *

UNITED STATES PATENT AND TRADEMARK OFFICE
CERTIFICATE OF CORRECTION

PATENT NO. : 5,828,733
DATED : October 27, 1998
INVENTOR(S) : David M. BARTON et al It is certified that error appears in the above-indentified patent and that said Letters Patent is hereby corrected as shown below:

On the title page, item [54] and column 1, line 2:
"TRANSMISSSION" with --TRANSMISSION--

Signed and Sealed this

Sixteenth Day of February, 1999

Attest:

Attesting Officer

Acting Commissioner of Patents and Trademarks